No. 835,983. PATENTED NOV. 13, 1906.
W. C. PLANK.
BAROMETER.
APPLICATION FILED AUG. 1, 1906.

WITNESSES:
Fred. Dibelius
A. E. Fay

INVENTOR
William C. Plank
BY Munn & Co
ATTORNEYS

UNITED STATES PATENT OFFICE.

WILLIAM CHARLES PLANK, OF LAS FLORES, MEXICO.

BAROMETER.

No. 835,983.

Specification of Letters Patent.

Patented Nov. 1 1906.

Application filed August 1, 1906. Serial No. 328,730.

*To all whom it may concern:*

Be it known that I, WILLIAM CHARLES PLANK, a citizen of the United States, and a resident of Las Flores, B. C., Mexico, have invented a new and Improved Barometer, of which the following is a full, clear, and exact description.

My invention has for its principal object the construction of a barometer of an extremely sensitive nature.

The range of an ordinary mercurial or aneroid barometer at a fixed level is very small, usually not over two inches. By the use of the principles which I will set forth below a barometer, which can be made in various forms and conveniently constructed in such a manner as to be readily carried in the pocket, can be given a range twice as great as that of the ordinary barometers now made.

Reference is to be had to the accompanying drawings, forming a part of this specification, in which similar characters of reference indicate corresponding parts in both the figures.

Figure 1:
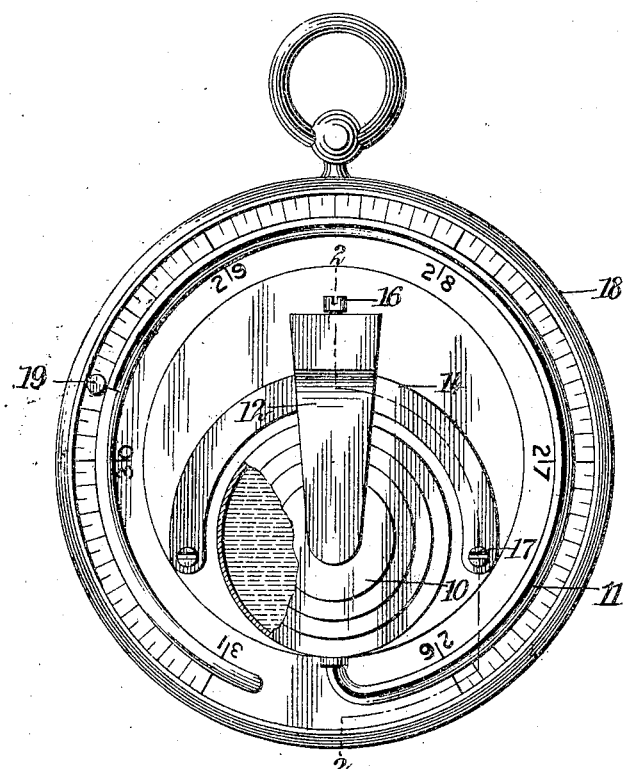
Figure 2:
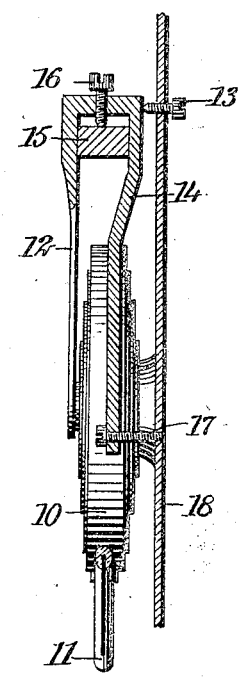

Figure 1 is a front elevation of one form of a barometer constructed in accordance with the principle of my invention, and Fig. 2 is a sectional view of the same on the line 2 2 of Fig. 1.

I have shown my invention as applied to a pocket-barometer; but it of course will be understood that it can be constructed in any other way to suit the particular use to which it is to be put. The barometer is provided with the usual vacuum-pan 10 of an aneroid barometer connected with a capillary tube 11, such as is used on thermometers. Both the pan and tube are then completely filled with an expansible liquid—such, for instance, as alcohol or mercury—and the tube sealed at its end. It will be obvious that under ordinary conditions the device would operate as a thermometer. By providing a spring 12 and attaching it to the center of the pan and then tightening it by any convenient means—as, for example, an adjusting-screw 13, passing through the back of the casing 18 and bearing on the under side of a plate 14, upon which the spring is supported—the tightening being carried on until the tension of the spring produces a vacuum in the capillary tube, the instrument is rendered sensitive to changes in atmospheric pressure as well as temperature. If now the device is provided with a suitable compensator to nullify the effects of changes in the temperature, it will make a complete barometer. For this purpose I have shown the spring as being separated from the plate 14, on which it is mounted, by a space having upper and lower parallel walls. In this space I mount a block 15, and with the block I connect a screw 16, said screw passing through a screw-threaded opening in the part of the frame on which the spring is mounted. This frame is also supported and in part regulated by a screw 17, engaging a casing 18.

The compensation is effected in the following manner: The block 15 is made of brass, while the frame 14 and spring 12 are made of steel. The greater expansion of the brass block 15 over that of the steel frame will by a rise in the temperature open the fork, thus increasing the tension of the spring, and thereby opening out the pan and compensating for the increased volume of liquid in the pan. By sliding out the brass block 15 toward the vacuum-pan 10 the opening out of the latter is diminished from the rise in temperature, and by moving the block in the other way it is increased. It will be seen, therefore, that by a proper adjustment so as to effect compensation the changes in temperature may be met.

It will be seen that this barometer can be made extremely sensitive by increasing the diameter of the pan 10 or making the capillary tube finer. It is easily practicable to double the sensitiveness of the barometers which are on the market.

Having thus described my invention, I claim—

1. A barometer comprising a receptacle for a liquid, a capillary tube communicating with the interior of said receptacle, and means for exerting a tension upon an expansible wall of said receptacle.

2. A barometer comprising a receptacle having an expansible wall, a tube communicating with the interior of said receptacle, said receptacle and tube being provided with an expansible liquid, and means for forcing the movable wall outwardly to create a vacuum within the tube.

3. A barometer comprising a receptacle having an expansible wall, a tube communicating with the interior of said receptacle, said receptacle and tube being provided with an expansible liquid, means for forcing the movable wall outwardly to create a vacuum within the tube, said means comprising a spring, and an adjusting device for forcing the spring outwardly from the receptacle.

4. A barometer comprising a receptacle having a movable wall, a spring connected with said movable wall, adjustable means for forcing said spring outwardly from the receptacle, and means for compensating for changes in temperature.

5. A barometer comprising a receptacle having an expansible wall, a spring connected with said wall, means for adjusting the tension of said spring on the wall, and a temperature-compensating device comprising a piece of metal bearing on said spring and having a greater coefficient of expansion than the material of the spring.

6. A barometer comprising a receptacle having an expansible wall, a spring connected with said wall, means for adjusting the tension of said spring on the wall, a temperature-compensating device comprising a piece of metal bearing on said spring and having a greater coefficient of expansion than the material of the spring, and means for moving said piece of metal toward and from the receptacle.

7. A barometer comprising a receptacle having a movable wall, a tube connected with the interior of said receptacle, said receptacle and tube being filled with an expansible liquid, a spring connected with said movable wall, a frame on which said spring is mounted, said frame and spring having a space between them bounded by parallel walls, a block located in said space, and bearing on said walls, said block having a different coefficient of expansion than the material of the frame and spring, and means for adjusting said block toward and from said receptacle.

In testimony whereof I have signed my name to this specification in the presence of two subscribing witnesses.

WILLIAM CHARLES PLANK.

Witnesses:
ANNA J. JEFFERY,
E. J. HOLLAND.